United States Patent [19]
Booras et al.

[11] 3,877,786
[45] Apr. 15, 1975

[54] MULTICOLORED REFLECTIVE ARTICLE AND ITS MANUFACTURE

[75] Inventors: Peter J. Booras, Keene, N.H.; Richard S. Brenneman, Natick; David W. Lovering, Needham, both of Mass.

[73] Assignee: Yankee Artists, Incorporated, Keene, N.H.

[22] Filed: June 28, 1973

[21] Appl. No.: 374,484

[52] U.S. Cl. .............. 350/105; 264/129; 350/97; 40/208
[51] Int. Cl. ............................................. G02b 5/12
[58] Field of Search .................... 264/129, 132; 350/97–109, 311, 317; 40/200, 207–210, 125 R, 125 E, 125 F, 130 B, 130 C, 130 D, 130 E, 130 F, 130 J, 135, 136

[56] References Cited
UNITED STATES PATENTS

| | | | |
|---|---|---|---|
| 2,407,680 | 9/1946 | Palmquist et al. | 350/105 |
| 2,422,256 | 6/1947 | Philippi | 350/105 |
| 2,571,962 | 10/1951 | Smith et al. | 264/13 |
| 2,587,325 | 2/1952 | Husted | 40/208 |

Primary Examiner—Ronald L. Wibert
Assistant Examiner—Michael J. Tokar
Attorney, Agent, or Firm—Morgan, Finnegan, Durham & Pine

[57] ABSTRACT

A method of coloring a reflex reflective device with glass beads therein by providing a transparent surface layer of a color-receptive resin, printing overlays in the form of thin resin films on selected areas of the surface of the transparent layer in one or more steps followed by drying the resin overlays to a hardened nonporous condition resistant to liquid colorants, and thereafter employing a background dye solution or other colorant liquid suitable for coloring the transparent resin layer by indiscriminately applying the coloring material to the entire face of the article to form the background color thereof without staining the color-resistant overlays.

The novel article accordingly bears a multicolored pattern with sharp lines of delineation between adjoining areas of different color inasmuch as neither the overlays nor the areas of the transparent layer underlying the overlays are stained by the background colorant; hence there is no interference with the color of light reflected through overlays of the preferred transparent type.

17 Claims, 5 Drawing Figures

PATENTED APR 15 1975 3,877,786

3,877,786

MULTICOLORED REFLECTIVE ARTICLE AND ITS MANUFACTURE

BACKGROUND OF THE INVENTION

1. The Field of the Invention

This invention is concerned with the articles having novel multicolored decorative structures and with novel methods of fabricating them which involve color-resistant resin overlays. Certain embodiments are concerned with devices having a plurality of areas that reflect light in different colors, and articles having reflex reflective characteristics are preferred, especially those provided with enclosed optical systems.

2. Prior Art

Reflex reflective signs and markers are preferred for many highway uses because of their highly desirable characteristic of brilliantly reflecting light back toward its source even though the incident beam may strike the surface at an angle other than normal. These markers typically have a layer of glass beads spaced at a predetermined distance from a flat reflector as in Palmquist U.S. Pat. No. 2,379,741, or the beads may have hemispherical metal coatings thereon as in McKenzie U.S. Pat. No. 3,065,559. Some embodiments described in the former patent have an exposed optical system while the latter discloses an optically enclosed system having a transparent flat-surfaced cover sheet that may be colored if so desired.

Markers displaying a plurality of colors of reflex reflected light have been manufactured for a long time, but, in general, they have been either costly to fabricate or extremely limited as to the hues that might be employed in areas of contiguous different colors. For instance, Palmquist U.S. Pat. No. 2,383,884 describes the application of black paint to the raised surfaces only of an embossed sign having a background of a different color. The application of the black paint did not require careful registration by reason of the raised pattern but embossing added to the expense of fabricating the sign. Also, this particular type of decoration is restricted to the use of an opaque paint or coating which masks the colored background, for the reflection of light through any type of colored transparent coating on top would encounter the problems of interference from the background color. Accordingly, Palmquist did not provide reflex reflection from all surface areas.

Palmquist U.S. Pat. No. 2,407,680 shows overlays in the form of transparent colored films or coatings on enclosed reflex reflective sheet material and various layers of that material may be colored also. However, excluding the white or silver light which is often employed as a neutral background, it is evident that providing reflex reflection from different hues in two or more adjoining areas of those reflectors involves either precisely registering different colored overlays relative to one another or accepting the discoloration which results from at least some of the light passing through two or more differently colored layers or overlays.

The retroreflective sign disclosed in Alverson U.S. Pat. No. 3,176,420 is capable of reflecting two colors, such as red and white, in the reflex manner but only because of a careful application of the pigmented red mastic over the pigmented white mastic in such a fashion as to leave the letter pattern uncoated by the red mastic.

A prior art procedure that has given good results has involved forming markers by cutting out a pattern laminate from a reflex reflective metal-backed substrate that reflected one hue and laminating it on a background reflex reflective metal-backed substrate which reflected a different hue. These colors are quite distinct because the upper pattern laminate masks the background beneath it so that none of the reflected light passes through layers of two different colors. Unfortunately, the product is relatively expensive as a result of the complicated procedure and the extra material required.

The present invention is particularly directed at providing multicolored articles, preferably of a reflex reflective type, wherein the boundaries of each adjoining area of a different hue are sharply delineated even though numerous different colors may be employed and wherein all colorant compositions may be of a transparent nature or optionally many, but not all, of them may be opaque. This invention is also concerned with producing such articles by a simple and economical process which does not require careful registration or the separate preparation of a screen or printing plate for the application of a second or subsequent colorant and which permits greater freedom in fabrication.

Unless it is otherwise qualified herein, the term "color" is employed in a broad sense to include black, white, silver and shades of gray as well as the various hues.

SUMMARY OF THE INVENTION

This invention relates to a colored article in the form of a solid substrate bearing a superimposed transparent layer of a color-receptive, solid resinous material having at least one selected colored area while at least one other selected area of said layer is colorless, and also having at least one solid nonporous overlay affixed to said transparent layer and overlying a selected colorless area thereof, said overlay being a resin containing film that is resistant to liquid colorants.

The invention also encompasses a novel process for making such articles by providing a solid substrate with a transparent solid layer of color-receptive resinous material superimposed thereon, covering at least one selected area of the surface of said transparent layer with a resin film overlay while leaving at least one other surface area of said transparent layer exposed, and applying a liquid colorant composition, such as a dye solution, to a substantial portion of the surface of said article at a time when said resin overlay is in a hardened, nonporous condition resistant to liquid colorants to color said exposed area of said transparent layer while the protected area beneath said overlay remains colorless.

Other aspects of the invention are concerned with one or more of such features as the substrate being equipped with means for reflecting light, desirably with reflex reflective characteristics and preferably in the form of an optically enclosed retroreflective substrate containing transparent beads; a protective outer coating of a colorless, transparent resin of a weather-resistant type; overlay films differing in color from that of the liquid colorant and also on occasion from such other overlays as may be employed; overlays that are either opaque or transparent, and sometimes colorless, as well as substrate material in sheet form. More specific procedures of the invention involve one or more of such techniques as positioning the overlay at random; applying the overlay in liquid form and hardening it prior to the general or background coloring step; utilizing certain combinations of materials, as exemplified by a polyamide resin for the transparent color-receptive layer together with an overlay containing an alkyd resin while a background dye is desirably dispersed in a polar solvent, or alternatively using an alkyd resin as the transparent layer with one or more overlays containing a polyvinyl alcohol resin as the film forming material and a nonpolar solvent medium for the background dye. Other aspects of the instant invention as well as its objects, benefits and advantages will be apparent to those skilled in the art upon consideration of the detailed disclosure hereinafter.

The terms "liquid colorant" and "colorant liquid" are employed herein to describe not only dye solutions and dispersions of solid preformed pigments but also precursor substances capable of participating in reactions that form dyes or pigments in situ.

DESCRIPTION OF SPECIFIC EMBODIMENTS

While the following detailed disclosure is directed mainly at the application of liquid colorants in the form of dye solutions, it is generally applicable to pigmentary materials also, especially those which may be deposited at relatively transparent or light-transmitting dispersions of pigments. Transparent pigmented layers are known in the art, and these are suitable for some embodiments of this invention. For example, layers capable of transmitting at least about 5% of the incident light may be suitable, particularly for certain dark colors, whereas at least about 20% light transmission is usually preferable. It is contemplated that a pigmentary material may be applied in the form of a paint or enamel in some instances.

Figure 1:
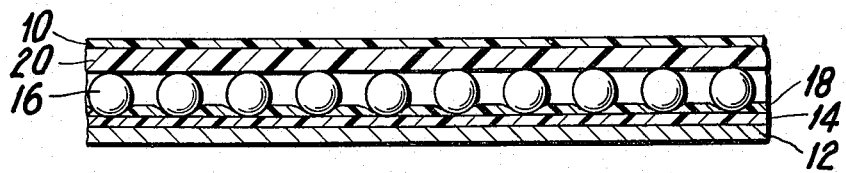
FIG. 1 is an enlarged fragmentary sectional view through a sheet form of the article at an early stage in the process of this invention, and depicting a reflex reflective substrate provided with a superimposed layer of dyeable resin.

The invention may best be described in connection with the drawings wherein FIG. 1 shows a layer 10 of a dyeable solid resin superimposed upon one form of reflex reflective substrate of the covered or optically enclosed type. As illustrated, this reflective device is composed of a mirror-like reflector 12 which may be a polished sheet of aluminum or a silver coating on the transparent spacing layer 14 of a synthetic resin which serves to keep the layer of transparent glass beads 16 at the proper distance from the reflector 12 to provide a brilliant reflex reflection of incident light. For securing the glass beads 16 against displacement, particularly where the article is likely to encounter vibration in service, a layer 18 of a binder resin is provided and the layer of polymethylmethacrylate or other transparent, colorless synthetic resin 20 serves as an enclosure for the glass beads and provides a flat surfaced exterior that substantially eliminates the distortion of the reflex properties of the device that occurs when the beads of an exposed optical system are covered with rain drops.

If necessary or desirable the substrate may be reinforced by affixing a strong backing member 21 (see FIG. 5), e.g., by laminating it, to the rear of the reflecting element 12. Also, either the layer 12 or the exterior face of the reinforcing member 21 may be covered with a pressure sensitive adhesive for convenience in mounting the article for many uses, such as decals, signs, markers, or decorative sheets.

In some instances it may be desirable to omit the layer 10 and construct the reflective substrate with a single layer 20 that serves to enclose the optical elements and provide a flat surface while also possessing the desired characteristic of ready dyeability in sheet form. Alternatively, it may often be desirable for the manufacturer of colored retroreflective articles to buy a commercial reflex reflective substrate and coat it with a particular resin of his choice to the exact thickness he may desire in order to obtain better control of the dyeing operation.

Figure 2:
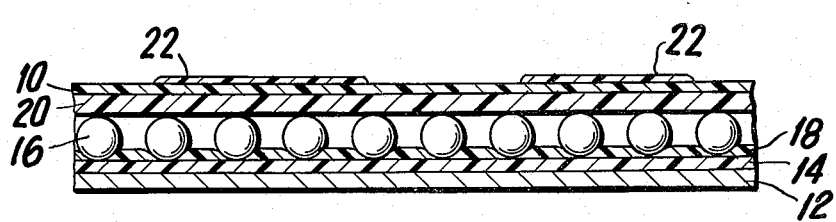
FIG. 2 is a similar view at a later stage after overlays have been applied to the article.

Turning now to FIG. 2, this depicts the same article with two overlays 22 each covering a selected area of the exposed face of the dyeable layer 10. These overlays are preferably applied to the surface of layer 10 in liquid form as a solution of a suitable resin in a solvent that desirably has relatively little or no effect or action upon the resin layer 10. The overlays may be applied by a wide variety of techniques, including offset, gravure, and letter press printing, as well as by spraying or brushing either freehand or through stencils, or by silk screen methods, or by roller coating onto the raised patterns on embossed substrates. The overlays 22 may be positioned by changing locations on specific areas of the surface of the dyeable layer 10, as is necessary in the fabrication of serially numbered markers.

They may be applied as solvent-free, liquid resin compositions containing a catalyst or reactive hardener; but customarily, the overlays are deposited as liquid films and then hardened by drying, usually at elevated temperatures, to evaporate the solvent and sometimes also to oxidize a component of the vehicle of the surface coating compositions. This bonds the overlay to the layer 20 as a solid, nonporous resin that is impervious to the dye solution employed in the next step. Alternatively, the overlays 22 may be preformed in being cut out of a sheet or film of resinous material and then bonded to the layer 10 by means of an adhesive or by a laminating procedure. In general, applying a liqiud film is preferred over the use of a preformed overlay as it permits greater flexibility in decorating the article.

With the overlays 22 in a hardened and dye-resistant condition, the article of FIG. 2 is subjected to dyeing in a more or less indiscriminate manner wherein the dye solution is applied to much or all the surface of the article. For example, the entire article may be immersed in a dye bath or the solution of the dye may be sprayed or roller coated over the entire article face which is being decorated, namely the uncoated or exposed areas of the dyeable layer 10 as well as the overlays 22. There is no need to attempt to prevent contact of the dye solution with the overlays 22 because these resin films resist both staining and penetration by the dye solution; accordingly they prevent dyeing of the areas of layer 10 that they are covering.

Figure 3:
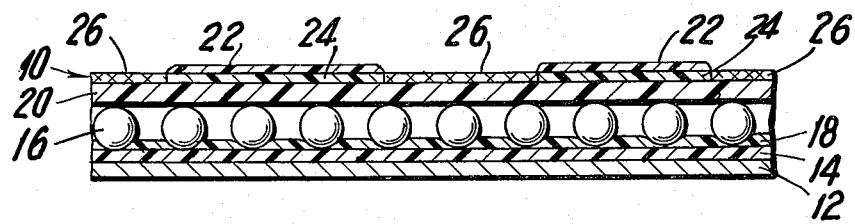
FIG. 3 is also a similar view showing the effect of subsequently applying a dye to the surface while the overlays are in a dye-resistant hardened condition.

After removing the excess dye from the article by wiping or by rinsing it in a suitable solvent, the article then has the appearance depicted in FIG. 3 which illustrates one embodiment of a finished article according to the present invention. In the layer 10, the areas 24 beneath the overlays 22 are transparent and colorless (i.e., water white), because the impermeable films 22 prevented the dye from penetrating to the underlying zones 24 of layer 10 and coloring them. However, the remainder of the surface of dyeable layer 10 is exposed to contact with the dye solution and these transparent regions or areas 26 are colored (as indicated by the cross-hatching) by the soluble dye.

The dye that colors areas 26 is termed a "background dye" herein for convenience, since it may be readily employed in some embodiments of the invention to color a much larger area of the article than the areas occupied by the overlays, and also because this dye may be applied in an indiscriminate manner and often may be employed as the final step of color application. Nevertheless, it will be appreciated that the dyed background areas 26 may be smaller in total area than the overlays 22 or more vivid in color or in more important locations on the article than the overlays.

Figure 4:
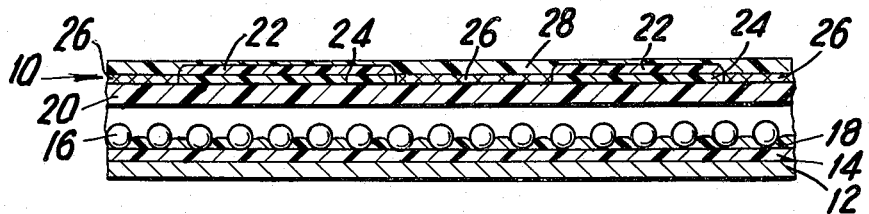
FIG. 4 is another similar view showing a modification of the finished article wherein the entire surface is covered with an outer coating of weather-resistant material.

Turning now to FIG. 4, it will be observed that this embodiment of the article includes a weather-resistant outer coating 28 which is transparent and colorless (i.e., water white). This final layer may be applied by any of the conventional methods of brushing, dipping, spraying or roller coating of a lacquer, such as polymethylmethacrylate dispersed in a suitable hydrocarbon solvent, followed by drying to harden the resulting film by evaporation of the solvent; or a varnish may be applied and hardened by drying with oxidation of the binder component. Alternatively, the protective layer 28 may be bonded to the article by casting or laminating techniques. This outer coat may have several functions, as exemplified by minimizing erosion and scratching of both overlays 22 and background areas 26 as well as preventing leaching of colorants from those surfaces when the article is being washed or cleaned in service, and also serving as a carrier for a dispersed ultraviolet absorbing compound that can minimize fading of the colorants. It may also be noted that the transparent glass or plastic spheres 16 are not in contact with the layer 20 in this particular embodiment of the present articles.

Figure 5:
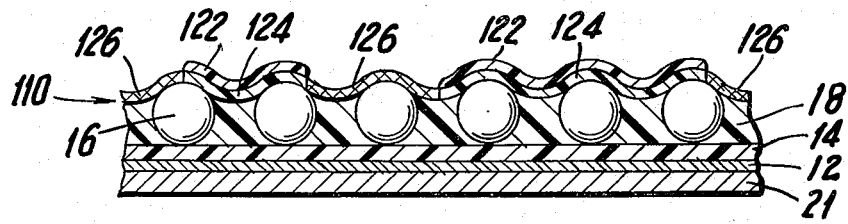
FIG. 5 is an enlarged fragmentary sectional view through another embodiment of an article according to this invention wherein the reflex reflective substrate is of the exposed type.

FIG. 5 illustrates another embodiment of the articles of this invention wherein the reflective substrate is of the exposed lens type. In this version, there is no flat surfaced cover in front of the beads 16 which are somewhat more than half covered by a hardened layer of binder resin 18 which secures them on the transparent spacing layer 14. That spacing layer provides proper separation from the reflector element 12, and the entire article is supported and stiffened by the backing member 21. The backing or reinforcing layer may be constructed from a wide array of reinforcing materials ranging from corrugated paperboard to a plastic laminate reinforced with glass fibers, etc. or a metal plate according to the physical characteristics required for the particular use. In FIG. 5, the dyeable layer 110 is not flat as in the preceding figures but follows the contours of the areas of the beads which are exposed above the surface of layer 18. In addition to the dye-colored areas 126 (designated by cross-hatching in FIG. 5), layer 110 includes the colorless and transparent areas 124 which are beneath the colorless and transparent overlays 122. As in the other embodiments, the colorless areas 124 of dyeable resin layer 110 were sealed against penetration and coloring by the background dye by the hardened dye-resistant overlay films 122 which also were not colored by that dye.

For outdoor uses, this embodiment of the invention is usually less desirable than those of the optically enclosed type described hereinbefore inasmuch as rain drops can seriously distort the contours imparted to the surface of the article by the tops of glass spheres 16 and thereby substantially reduce the reflex reflection performance of the article. In addition, this type of article is somewhat more difficult to clean and to keep clean than a smooth flat surface. Nevertheless, an exposed optical type of reflex reflection system is sometimes preferable for certain outdoor applications of the present invention. For example, large markers on roads or airport runways may be constructed by first painting a large area with aluminum or white paint, sprinkling glass beads of the reflex type onto the tacky paint and allowing it to dry; thereafter spraying or brushing the overall coating of transparent dyeable resin onto the glass beads and drying it, followed by the application and drying first of a solution of a colored overlay material that is dye-resistant in the solid state, next of a background dye of a different hue to dye the dyeable resin coating and finally a weather-resistant transparent coating over the entire surface of the markers.

While the foregoing process of this invention has been described with particular reference to articles having two colors, of which one may be the silver or golden color of a reflector element, it will be readily apparent to those skilled in the art that a vast array of decorative effects are obtainable, provided only that a sufficient number of overlay films of different colors are printed or otherwise affixed to the dyeable layer 10. For instance, one can silk screen green ink overlays onto certain selected surface areas of the dyeable layer 10; next, another silk screen may be utilized in printing surface coatings containing a red ink or dye onto other areas of layer 10; and thereafter, various other colored transparent coatings can likewise be deposited in still other free areas on layer 10. In addition, one may brush a colorless solution of a resin onto some other free spots and spray an opaque gray paint through a stencil in still other locations thereon. In many cases, drying after each application of a different coating material is advisable to avoid smearing. Finally, after application of a suitable light blue dye for coloring the remaining exposed or uncoated areas of layer 10, one will have an article wherein many different colors, including green, red, silver, (from the colorless overlay) and black (from the nonreflecting gray overlay), are seen against a bright light blue background when the article is illuminated with a beam of light at night; and all of these colors are sharply delineated from one another.

Such multicolored and variegated effects are obtained in the present method without requiring multiple careful registrations in printing each of the various colors as was necessary in the prior art. With the present invention, one need only select the general location where one wishes to place dye-resistant overlays, and these may be printed at random, i.e., changed from one location to another as in making markers bearing different printed serial numbers of one color in a single printing operation, for the subsequent general or background dyeing step provides a different color for the entire background which despite its changing configuration up to the edges of the overlay numerals is sharply delineated and does not alter the overlay color. In contrast, conventional prior art involved two printing operations and a pair of printing plates for each individual serial number, one plate to print each set of numerals and a second plate to print the background around that particular set, as well as carefully registering the background printing plate relative to the figures printed by the numeral printing plate. Thus, substantial improvements in convenience, lower equipment costs and flexibility of operations are obtainable with the novel process.

The layer 10 or 110 in the drawings is a transparent resin layer, coating, or film covering at least one face or side of the substrate, and it is customarily dyed in such fabricated form by the background dye which is preferably of the substantive type. In the case of very thin films, resins that are normally regarded as translucent may be employed by reason of being sufficiently clear to transmit reflex reflected light without excessive distortion or dispersion of the rays. Affixing the dyeable resin to a substrate by a coating method, such as dipping, spraying or roller coating with a liquid resin or solution of the resin, is usually preferred, but extrusion as a film or sheet for lamination or adhesion to the substrate may also be employed in the case of a thermoplastic resin. Among the many resins suitable for the purpose are: methyl methacrylate polymers and copolymers with styrene or alpha-methyl styrene, cellulose acetate, cellulose nitrate, nylons, polycarbonates, polyethylene, polypropylene, polysulfone, styrene-acrylonitrile copolymers, styrene-butadiene copolymers, urea-formaldehyde, vinyl butyral, and vinylidene chloride copolymers. Nylons have provided good results with solutions of the background dye in polar (aqueous) solvents; and subsequent scraping below the surface of the dyed zone indicated that the dye had penetrated to a substantial depth in the nylon. Adding a small amount (e.g. 1%) of acetic acid often intensifies the color produced in the nylon. Where the background dye is dissolved in a nonpolar organic solvent, a dyeable alkyd resin is often preferred for the transparent layer 10.

The overlays 22 must be firmly bonded to the dyeable layer 10 and they must be resistant to permeation by any background dye solution that is applied over the entire surface of the article, but the overlays may be transparent, translucent or opaque. In general, transparent films are preferred on the basis of offering the greatest latitude for decorative purposes, particularly in conjunction with brilliant reflex reflection. The overlays 22 may be as colorless as water, in which case they reflect light having the same appearance as uncovered reflector elements, and this is usually of a silvery white appearance. However, for many purposes it is desirable to employ overlays 22 which are colored as well as transparent by reason of containing a suitable dye or ink incorporated into the overlay material prior to its application to the dyeable layer 10. In these embodiments, the light reflected back through the overlay from an incident light beam has the same color as the dye contained in the overlay film; and this is another reason why it is important to have a solid, nonporous overlay film which is resistant to the background dye for any inclusion of the latter dye in the overlay 22 or staining of the overlay by it would spoil the color of the overlay. The overlays may also be opaque films resulting from the application of any paint or enamel containing insoluble pigments or fillers which are dispersed in any vehicle containing a binder resin capable of suitable adhesion to the dyeable layer 10. Inasmuch as there is little or no reflection from such a paint or enamel the overlays appear black at night under incident light in contrast with the bright reflection from the colored areas 26 of layer 10 which transmit the reflex reflection; whereas such enamels will appear in their normal color of gray, etc. when viewed in normal daylight.

Resin components for the overlays include transparent colorless resins of either thermoplastic or thermosetting types. These include acrylic resins, such as polymethylmethacrylate; cellulosic materials, as exemplified by cellulose acetate, cellulose triacetate, cellulose acetate butyrate and ethyl cellulose; linear polyamides, such as the nylons; polystyrenes; polyvinyl chloride and polyvinyl chloride-acetate copolymers; amino resins, such as melamine-formaldehyde; polyesters, as particularly exemplified by alkyd surface coating resins and liquid unsaturated polyester resins; epoxies; polyurethanes and polyvinyl alcohol. Of these polymers, alkyds and acrylic resins are often preferred along with polyvinyl alcohol. When the latter is used out-of-doors, the overlay should be covered by a weather resistant coating such as the layer 28 in FIG. 4. Also, silicone resins, such as the various alkyl polysiloxanes, may be employed as a component of the overlay compositions, since these solid silicones are highly resistant to wetting and permeation by such a polar solvent as water.

In preferred embodiments of the present method; it is essential to employ different resins for the dyeable transparent layer and the dye-resistant overlay; otherwise the desired different effects would not be obtained. Thus, an alkyd resin cannot be used as both the dyeable layer and the dye-resistant component of its overlays in the same article, even though this resin may be employed as a dye-resistant component of the overlay when the background dye is dissolved in a polar solvent, such as water, whereas with a different solvent medium of a nonpolar nature (e.g. xylene) for the dye, an alkyd composition may provide good results as the dyeable resin layer. Another embodiment of the process involves the aforementioned incorporation of a silicone compound, such as dimethylpolysiloxane, in the overlay composition so that it will repel an aqueous solution of the background dye.

The transparent resin strata 10 is not colored while it is in the form of a powder or liquid but after fabrication into a layer of solid resin; therefore a direct or substantive dye is generally preferred for use as the background dye with suitable transparent resins. Besides those employed in the examples hereinafter, these dyes may be exemplified by Nyliton fast scarlet DYL (GAF Corp.) which is also known as Acid Red 350, Fastolon red BR CONC, *Fastolon rubine 5 BLL (Allied Chemical Corp.), Erio F. Rubine 3GP, Polyamide red B, *Nyliton fast blue FLN which is also known as Acid Blue 25, *Fastolon blue GL, Alphazurine FGND CONC of color index (C.I.) No. 42090 (National Aniline Corp.), *Nyliton fast black DS (mixture), *Nyliton fast orange DNL which is also known as Acid Orange 116, Nyliton fast yellow RRL which is also known as Acid Yellow 159, *Nyliton fast yellow 5GL, *Nyliton fast yellow 3GL, Nyliton fast yellow GLL, *Fastolon yellow LBR, Polyamide Red B (Ciba-Geigy Corp.) and Erie Flavine S CONC of C.I. No. 49010 (Allied Chemical Corp.). The dyes marked with asterisks have displayed good resistance to fading in nylon coatings subjected to fadeometer tests. In the case of layers of nylon or cellulose acetate and similar esters, acid dyes are highly desirable by reason of their chemical affinity for such materials and rapid action in dyeing them; acid dyes do not have such an affinity for alkyd resins.

Other types of dyes may also be employed for dyeing layers composed of suitable transparent resins, including sulfur, vat, azo and naphthol dyes. In addition, chrome and other mordants may be used with selected plastics, such as ethyl cellulose, to chemically insolubilize a dye. In many instances, the selection of the dye will involve such economic processing considerations as the temperature, length of time and number of separate baths required for the dyeing operation, as well as its adaptability to continuous processes.

An even wider choice of dyes is suitable as colorants for the overlays including those mentioned hereinbefore for layer 10. These dyes are not limited to those capable of dyeing a preformed solid resin layer as they are typically incorporated into the overlay composition before application and hardening. Accordingly, the colorant for the overlay may be any dye compatible with any of the aforementioned resins or binder components of the overlay compositions, and any suitable solvent can be employed. Even opaque pigments or dark eyes that provide opaque coloration may be used in relatively large proportions in any overlays wherein the absence of reflex reflectivity is acceptable.

Although the present invention has been described in detail in respect to reflex reflective devices provided with beads and planar reflectors, it is equally suitable for those having glass beads with hemispherical reflective coatings and for prismatic reflex reflectors. The novel article and method are particularly useful with such lenticular reflective systems in providing for the simple and economical construction of articles displaying sharply delineated multicolored reflections in the true colors that result from the passage of light through a single colored resin layer and without requiring a plurality of layers of glass beads or masking devices or multiple printing plates or other means of carefully registering a plurality of images.

For a better understanding of the nature, objects and advantages of this invention, reference should be had to the following examples which are included for the purpose of illustrating the invention rather than establishing limits thereon. Unless otherwise stated, all proportions are set forth in terms of weight.

EXAMPLE 1

Sheets of a commercial reflex reflective sheet material of the optically enclosed glass bead type (SCOTCHLITE manufactured by the 3–M Co.) are coated with an alcohol-soluble nylon resin (ELVAMIDE 8063 produced by E. I. du Pont de Nemours & Co.) by immersion in a solution of 9 parts of that polyamide resin in a mixture of 40 parts of ethylene dichloride and 60 parts by weight of ethanol followed by wiping the sheets against a No. 10 wirewound rod to remove excess solution. The material is dried for 2 minutes in an oven maintained at a temperature of about 200°F. to eliminate the solvent and to provide a thin uniform film of about 0.001 inch thickness of nylon completely covering the smooth front face of this retroreflective material. After cooling this sheet material, a design is printed on top of the nylon coating on several of these sheets by the silk screen technique using a transparent, lemon yellow, silk screen ink (SCOTCH-LITE No. 722 of the 3–M Co.) which has an alkyd resin binder component and the design is subjected to air-drying at 200°F. for 5 minutes. When these sheets are viewed at night under the illumination of automobile headlights, it is noted that the design appears as a brilliant yellow reflex reflection against a silver-white background of the same approximate level of illumination. Silver-white is the normal appearance of the uncolored reflective material, and it is evident that the transparent nylon layer thereon does not significantly alter its reflective characteristics.

Thereafter, the printed sheet is completely immersed in an aqueous solution containing 3% of Acid Blue dye No. 104 (a product of the Allied Chemical Co. with color index No. 42735), whereby the entire surface, including the printed yellow overlay pattern is exposed to the dyestuff in this dyeing operation. This dye is also sold by the GAF Corporation as "Brilliant Wool Blue FFRS, Extra." After the dyeing operation, the excess dye solution is washed off of the sheet with running water and the sheet is dried by wiping. This product is now found to have a transparent brilliant blue background surrounding the bright yellow design; and the color of the yellow overlay is not affected by the blue dye, for there is no overlapping of the two colored areas of the sheet product. Upon illuminating the sheet at night by means of a headlight beam, it is observed that there are brilliant reflections of the reflex type from both the lemon yellow design and the blue background without any blurring or intermingling of the two colors.

EXAMPLE 2

In producing an article with a background of a different color, another of the sheets bearing the printed yellow image is immersed in a 3% solution of a red dye in water at a temperature of 80°F. for 1 to 2 minutes. After removing the excess dye by rinsing with water, the sheet is dried at 140°F. in an oven for 5 minutes. Upon examining this differentially dyed article under both daylight and under headlamps beams at night, the colors are observed to be bright yellow and red with a sharp line of demarcation between them.

This red dye is the Allied Chemical Co. product known as "Fast Crimson GR conc. 150%" with color index No. 18050.

EXAMPLE 3

Another of the nylon-coated reflective sheets printed with the yellow design described in Example 1 is subjected to dyeing by complete immersion in a 1% solution in water of Wool Violet 4BN dye (Allied Chemical Co.—color index No. 42640) for 3 minutes at 75°F. After removing the excess dye by rinsing with water and drying for 10 minutes at 140°F., the article is found to have a violet background which is sharply distinct from the yellow image which suffers no alteration in color during the second (violet) dyeing operation.

EXAMPLE 4

The general procedure of Example 3 is followed in dyeing at 80°F. the background of still another of the yellow-printed reflective sheets with a 2% solution in water of Diazamine Brilliant Scarlet 2BL (Sandoz Chemical Co.—color index No. 29210). After the excess dye solution is removed and the sheet dried, it is observed that the yellow image is unchanged in color and sharply delineated from the scarlet background color under both normal daylight and illumination by automobile headlamps only.

EXAMPLE 5

Another nylon coating solution is made up by dissolving 2.0 grams of nylon BCI 829, an alkoxy alkyl substituted 6:6 nylon product of Belding Chemical Industries, in a solution of 48 grams of a mixture of 95% butanol and 5% water by weight. This solution is used to coat the front surface of a 6 × 12 inch sheet of the reflective substrate of Example 1 using the No. 10 rod to remove excess solution.

Next, the pH of the solution is lowered by adding 0.3 gram of citric acid and two more sheets of the same size and material are coated with this modified coating solution. All three of the treated sheets are heated in an oven at 240°F. for 30 minutes to produce cross-linking of adjacent polymer chains under the influence of the acid catalyst. Improved physical properties result from such cross-linking, and the nylon film displays better abrasion resistance as well as better adhesion to the substrate when soaked in water or a detergent solution.

After this heat treatment of their thin nylon layers or coatings, the three sheets are printed as before with the same transparent, yellow silk screen ink and allowed to dry in the air overnight at room temperature before being placed briefly in an oven maintained at 200°F. to complete the drying. Next, each of the printed sheets is immersed in another portion of the same blue dye solution used in Example 1 to provide the background color. After washing off the excess dye and drying the samples, they are found to display the same reflection characteristics and sharply delineated yellow and blue colored areas as before.

One of these samples is overcoated by the application with a paint brush of an acrylic resin solution in the form of the Rohm and Haas Co. product ACRYLOID B66 diluted with an equal volume of toluene. The resulting clear and colorless surface coating protects the colored layers beneath it from the weather.

EXAMPLE 6

A sheet of the same commercial retroreflective material is coated with a clear and colorless alkyd resin solution (SCOTCHLITE No. 700 product of the 3-M Co.) and dried for several days at room temperature; then a yellow design is printed on the alkyd layer by the silk screen technique using a transparent yellow ink which is then dried at a temperature of 80°F. The printed image displays a brilliant retroreflection when illuminated by headlamps. This ink contains a polyvinyl alcohol binder (No. 52–06 of E. I. du Pont de Nemours & Co.) dispersed in water and the coloring material is a tartarzine dye, FD&C Yellow No. 5 (color index No. 19140), distributed by H. Kohnstamm & Co.

Upon rubbing the entire surface of the article with the felt tip of a blue colored MARKS-A-LOT marker (a wide felt tip dispenser of a toluene solution of a general purpose marking ink) and rinsing the surface with VARSOL No. 2, it is observed that the background of clear alkyd resin is colored blue but that the marker ink does not penetrate or alter the color of the yellow design. Also, it is evident that the hydrocarbon rinse quickly flushes the excess dye from the surface of the printed area without substantially removing the blue color from background areas. The two colors on the article are distinct and sharply defined under daylight and they exhibit a brilliant reflection upon being illuminated with headlamp beams at night.

EXAMPLE 7

Another two specimens of the reflective substrate of Example 1 are coated by immersion in still another nylon solution which contains 4% nylon BCI 829, and 1% nioxime (1,2-cyclohexanedione dioxime) in a 95–5 butanol-water solvent mixture. As before, the coated substrates are wiped against a rod and dried in an oven at moderately elevated temperatures.

Next, the nylon coatings of the two articles are printed with a silk screen pattern using a transparent blue silk screen ink having an alkyd resin binder in its vehicle, and the printed articles are dried for a few minutes in an oven maintained at approximately 200°F. to form nonporous, water-resistant blue overlay patterns on the colorless substrate.

One of the two printed specimens is immersed in an aqueous solution of nickel chloride ($5\%NiCl_2$) for 5 minutes at room temperature and the other is similarly treated for a half hour. After these treatments, the articles are promptly washed with water and dried. Inspection of the articles reveals that both have a pattern of transparent blue overlays on a transparent pink background that extends over the remaining surface area of the articles. This pink coloration results from the formation of pink pigmentary material by reaction of the nickel salt with the nioxime within the nylon coating, and the specimen immersed in the nickel chloride solution for 30 minutes displays a somewhat deeper hue than the pale pink of the other sample. Both articles have distinct pink and blue areas that are distinct and not overlapped, merged or blurred. In addition, both the pink and blue areas on the articles exhibit retroreflective characteristics.

While the present invention has been described in specific detail in regard to a few embodiments of the invention for the purpose of full disclosure, it will be apparent to those skilled in the art that many other modifications and variations fall within the purview of this invention, especially in respect of the numerous suitable colorants, solvents and resins. Accordingly, this invention should not be construed as limited in any particulars except as may be recited in the appended claims or required by the prior art.

What is claimed is:

1. A colored article which comprises a reflex reflective substrate bearing a transparent solid surface layer of a color-receptive resinous material having at least one selected colored zone and at least one selected colorless zone, and at least one overlay of a solid nonporous resin composition resistant to liquid colorants, said overlay being affixed to said transparent surface of said substrate and overlying a selected colorless zone thereof.

2. An article according to claim 1 in which said colored transparent zone is colored by a pigment.

3. A colored article which comprises a solid substrate with a superimposed transparent solid layer of dyeable resinous material having at least one selected dye area and at least one selected colorless area, and at least one overlay film of a solid nonporous dye-resistant resin composition affixed to said transparent layer and overlying each selected colorless area thereof.

4. An article according to claim 3 in which said substrate is provided with means for reflecting light.

5. An article according to claim 3 in which said substrate has reflex reflective characteristics.

6. An article according to claim 3 in which said substrate is an optically enclosed reflex reflective substrate.

7. An article according to claim 6 in which a protective layer of a colorless, transparent, weather-resistant resin is superimposed on said overlay and the dyed transparent layer.

8. An article according to claim 3 in which at least one overlay contains a colorant of different color than that of said dyed area.

9. An article according to claim 3 in which at least one overlay is transparent.

10. An article according to claim 3 in which at least one overlay is colorless.

11. An article according to claim 3 in which at least one overlay contains a pigment.

12. An article according to claim 3 in which said substrate is a sheet material.

13. An article according to claim 3 in which at least one overlay contains a first colorant having a color differing from that of said dyed area and at least one other overlay contains a second colorant having a color differing from those of said first colorant and said dyed area.

14. An article according to claim 3 in which said transparent layer comprises a polyamide resin and said overlay comprises an alkyd resin.

15. An article according to claim 3 in which said transparent layer comprises an alkyd resin and said overlay comprises polyvinyl alcohol.

16. An article according to claim 5 in which said substrate comprises a back reflector, an overlying transparent resin matrix and a layer of small transparent spheres embedded in said matrix and held in spaced relationship out of contact with said back reflector.

17. An article according to claim 16 in which said reflector is of silvery appearance and said spheres are glass beads.

* * * * *